United States Patent
Aull et al.

(10) Patent No.: US 7,532,122 B2
(45) Date of Patent: May 12, 2009

(54) SYSTEMS AND METHODS FOR VERIFYING THE IDENTITIES OF RFID TAGS

(75) Inventors: Kenneth W. Aull, Fairfax, VA (US); Kenneth I. Talbot, Sunnyvale, CA (US); David B. Hindin, Sunnyvale, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 414 days.

(21) Appl. No.: 11/520,324

(22) Filed: Sep. 13, 2006

(65) Prior Publication Data

US 2008/0079540 A1    Apr. 3, 2008

(51) Int. Cl.
*G08B 13/14* (2006.01)
(52) U.S. Cl. .................. 340/572.4; 340/10.1; 340/10.42
(58) Field of Classification Search ............... 340/572.1, 340/572.8, 572.7, 10.1, 10.42, 508, 10.4, 340/10.3, 10.52, 572.4; 235/375, 385; 365/189.011, 365/190, 192
See application file for complete search history.

(56) References Cited

U.S. PATENT DOCUMENTS

| 5,905,949 | A | 5/1999 | Hawkes et al. | |
| 7,450,010 | B1 * | 11/2008 | Gravelle et al. | 340/572.1 |
| 2007/0109100 | A1 * | 5/2007 | Jett et al. | 340/10.4 |
| 2007/0229230 | A1 * | 10/2007 | Drago et al. | 340/10.52 |
| 2008/0165005 | A1 * | 7/2008 | Burbridge et al. | 340/572.1 |

\* cited by examiner

*Primary Examiner*—Toan N Pham
(74) *Attorney, Agent, or Firm*—Tarolli, Sundheim, Covell & Tummino LLP (57) ABSTRACT

Systems and methods for verifying the identities of RFID tags are provided. An RFID reader is configured to transmit an interrogation sequence to an RFID tag and recover digital information stored on the tag from an RFID response signal. A verification module is configured to extract a plurality of characteristics of the RFID response signal associated with Technically Uncontrollable RFID Features (TURF) of the RFID tag, and verify the identity of the RFID tag according to these characteristics.

23 Claims, 4 Drawing Sheets

FIG. 7

SYSTEMS AND METHODS FOR VERIFYING THE IDENTITIES OF RFID TAGS

TECHNICAL FIELD

The present invention relates to radio frequency signal processing and, more particularly, to systems and method for verifying the identities of radio frequency identification (RFID) tags.

BACKGROUND OF THE INVENTION

RFID (Radio Frequency Identification) technology is rapidly becoming ubiquitous in the national supply chain. RFID technology offers a hope of major improvements in productivity. Unlike barcodes, they are capable of being scanned in bulk, even if they are hidden from plain sight. In the supply chain, bulk packaged goods, arriving, say on a pallet, can be accounted for and logged into the receivable accounts. At the retail checkout counter, an entire shopping basket can be scanned and the charges accumulated. Shoppers leaving a store can be checked for inventory which does not match the payment made.

For all their versatility however, RFID, regardless of manufacturer or technology employed, can be cloned. Given sufficient financial incentive, any RFID chip or device can be cloned. The technology to create the chips and antennas is widespread, and the incentives to do so are large. A good example is the pharmaceuticals industry, which is moving to RFID for tracking drugs in the supply chain. A sealed pallet might contain a thousand vials of a drug, and some drugs are very expensive. The incentives are great to produce fake drugs, which, when carefully labeled by cloned RFID will be accepted at a receiving site as genuine. Once a particular RFID has been duplicated, it is a straight-forward process to make copies of the responses of valid RFID. However, it may not even be necessary to manufacture an RFID clone. Given the incentives, it's possible that an insider attack at the original manufacturer of the RFID could be successful in obtaining useable cloned RFID.

SUMMARY OF THE INVENTION

In accordance with one aspect of the present invention, a radio frequency identification (RFID) reader system is provided. An RFID reader is configured to transmit an interrogation sequence to an RFID tag and recover digital information stored on the tag from an RFID response signal. A verification module is configured to extract a plurality of characteristics of the RFID response signal associated with Technically Uncontrollable RFID Features (TURF) of the RFID tag, and verify the identity of the RFID tag according to these characteristics.

In accordance with another aspect of the present invention, a method for verifying the identity of an RFID tag is provided. An RFID tag is interrogated to generate a response signal. A plurality of parameters is extracted from the response signal. The plurality of parameters has variances associated with technically uncontrollable features of the RFID tag. The extracted plurality of parameters is compared with at least one stored set of parameters in an associated memory to verify the identity of the RFID tag.

In accordance with yet a further aspect of the present invention, an RFID reader system is provided that is configured to verify the identity of an interrogated tag. The system includes means for interrogating an RFID tag to produce an RFID response signal. The system also includes means for analyzing the response signal to generate a plurality of verification parameters, where the plurality of verification parameters have variances associated with technically uncontrollable features of the RFID tag. The system further includes means for comparing the plurality of verification parameters to a set of stored parameters associated with the RFID tag to verify the identity of the RFID tag.

DETAILED DESCRIPTION OF INVENTION

As described previously, in order to provide an effective deterrent to cloning, it desirable to provide a system that relies on properties of an RFID tag that even an original manufacturer of the RFID tag could not reproduce. Such a solution therefore relies on characteristics that are beyond the control of either an original RFID manufacturer or another trying to reproduce an RFID tag. The robust solution proposed herein is based on chaos, essentially uncontrollable manufacturing variances, that are present in the manufacturing process of the RFID devices. These variances, since they are beyond technical control in the manufacturing process are referred to herein as Technically Uncontrollable RFID Features (TURF).

It is not cost-effective to modify existing RFID designs in order to directly measure these technically uncontrollable RFID features of an RFID chip. Instead, the focus of a viable solution is the indirect measurement of the cumulative effects of these uncontrollable features on the characteristics of the RF link between the RFID tag and an RFID reader, which provides a desirable and cost-effective approach to the evaluation of the technically uncontrollable RFID features. Because of these uncontrollable features, each RFID tag will have unique characteristics of frequency, timing, protocol and RF collision handling. In accordance with an aspect of the present invention, these minute variations of the character and statistics of the RFID response signal can be exploited such that an RFID reader designed for a given class of RFID tags can also measure the character and statistics imposed by technically uncontrollable features of the tags in RF links in such a manner as to identify each and every unique RFID tag by a unique signature associated with an RFID response signal (since the RF signal generated by every RFID is affected by the TURF). This approach—measuring the uncontrollable features via their impact on the radiated RF characteristics of the RFID chip—permits remote and mass interrogation, and also permits interrogation using devices that are only minor adaptations to existing RFID readers.

Figure 1:
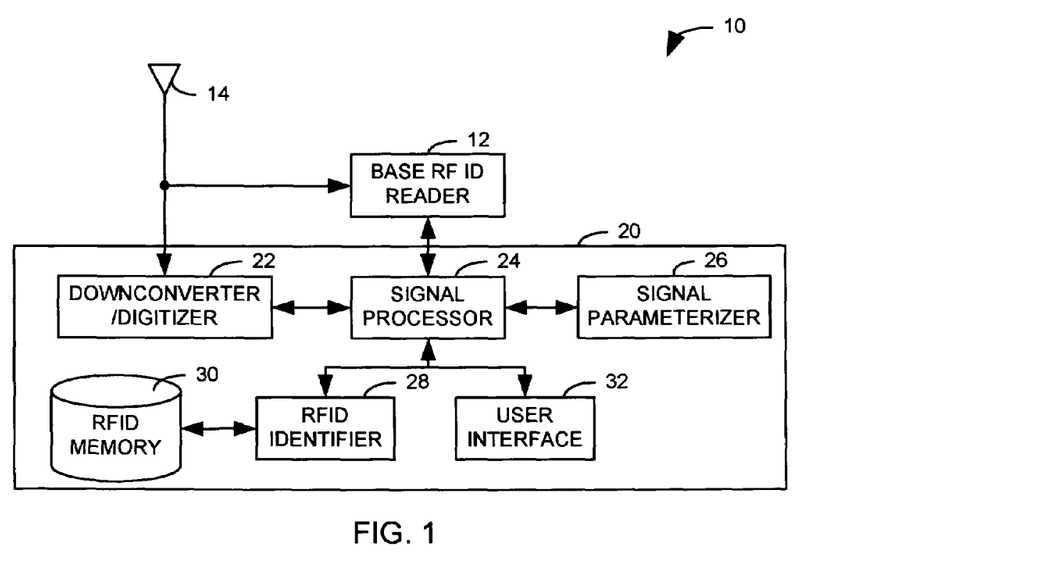
FIG. 1 illustrates a functional block diagram of an RFID reader modified to exploit technically uncontrollable features of RFID tags in accordance with an aspect of the present invention.

FIG. 1 illustrates a functional block diagram of an RFID reader 10 modified to exploit technically uncontrollable features of RFID tags in accordance with an aspect of the present invention. In the illustrated example, an RFID interrogation sequence can be generated at a base RFID reader 12 and transmitted via an associated antenna 14. In response to the interrogation sequence, one or more RFID tags (not shown) respond with respective one or more RF response signals. It will be appreciated that the tags can be active, that is, powered completely or in part by an associated power supply, or passive, with all power for the operation of the tag provided inductively by the interrogation sequence. The one or more RF response signals are received at the antenna 14 and provided to the base RFID reader 12 for analysis as well as to a verification module 20. Further, where multiple tags are present, the RFID reader 12 can determine a portion of the RF response signal associated with each tag in accordance with an associated synchronization protocol. This data can be provided to the verification module as synchronization data.

The RF response signal is received at a downconverter/digitizer 22 that collects digital samples of the RF response signal collected by the antenna 14. The digitized data are provided to a signal processor 24, which, in turn, provides the signal to a parameterization component 26. The association of each segment of digitized data with a particular RFID tag is supplied by the synchronization data provided through the connection between Base RF ID Reader 12 and signal processor 24. The synchronization data allows the parameterization component 26 to associate an appropriate portion of the received RF energy with each unique RFID in the field of regard appropriately. The parameterization component 26 extracts a plurality of parameters from the properly associated RF response signals and provides the extracted parameters associated with each RF tag to the signal processor 24. The signal processor 24 associates the extracted parameters with RF tag information extracted by the Base RFID reader 12.

The extracted parameters and the RF tag information are provided to an RFID identifier 28. The RFID identifier 28 checks to see if the RF tag information represents a known tag, whose TURF tag data is stored in an associated RFID memory 30. If the tag is unknown, the RF tag data can be stored in the memory 30, along with the extracted parameters. If the tag is known, a stored set of TURF signal parameters are returned to the RFID identifier 28 and the RFID identifier 28 compares the extracted parameters to the parameter set retrieved from the RFID memory 30 to verify that the interrogated tag is genuine. It will be appreciated that the stored parameters can include parameters recorded by the reader 10, parameters recorded by the manufacturer and stored in a remote database, or even a set of expected parameters stored in the tag itself and transmitted with the RFID to the Base RFID reader 12.

For example, a distance value (e.g., Euclidian distance, Manhattan distance, etc.) can be calculated between the stored parameters and the extracted parameters, and the distance value can be compared to a threshold value. If the distance value falls below the threshold value, the tag is accepted as genuine. If the distance value exceeds the threshold, the tag can be determined to be counterfeit, and the interrogated tag is rejected. The result of the comparison, along with the RF tag information, can then be provided to a user at a user interface 32.

It will be appreciated that the illustrated diagram is merely functional, and that the reader can be implemented differently in different applications. For example, in some implementations, it is possible to incorporate some or all of the components 22, 24, 26, 28, 30, and 32 of the verification module 20 into an RFID Reader, for example, as software or firmware modules. This depends on the capability of software storage, processing capability, and the sophistication of the signal digitalization associated with the reader. In other implementations, the verification module 20 can be implemented in separate hardware that works in combination with an existing reader.

It will be appreciated that a system 10 in accordance with an aspect of the present invention can be applied to RFID readers operating at extremely low frequencies, say at the audio level, or at higher frequencies, say at infrared, or visible light, or beyond to higher frequencies. The techniques used are substantially similar regardless of frequency. A given system 10 can be designed to operate with a selected subset of all available standards, open or proprietary, used to transmit data from a set of classes of RFID. Each specific standard will use different methods of transmission, in frequency, in time, and in modulation.

Figure 2:
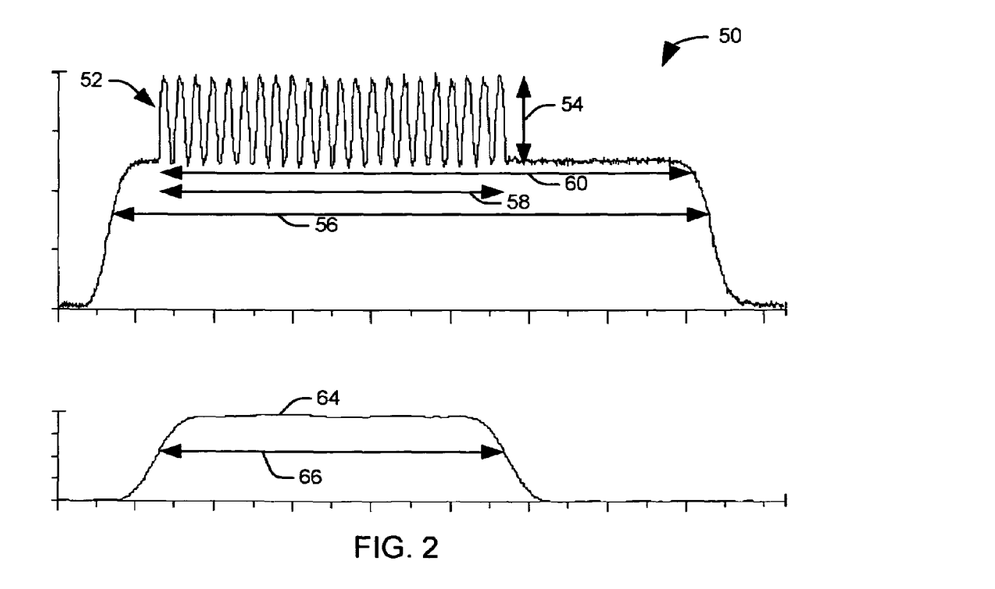
FIG. 2 provides a graphical illustration of a portion of an RFID response signal and a plurality of associated parameters utilized to verify the identity of an RFID tag in accordance with an aspect of the present invention.

FIG. 2 provides a graphical illustration 50 of a portion of an RFID response signal and a plurality of associated parameters utilized to verify the identity of an RFID tag in accordance with an aspect of the present invention. A first illustrated signal 52 represents the signal response at one of at least a first and second modulation frequencies used in a response signal to convey the digital RFID information to the reader. A number of parameters utilized in tag verification can be derived from these frequencies, including the frequencies themselves, their harmonic frequencies (e.g., $2^{nd}$-$5^{th}$ harmonic frequencies), and a weighted average of the frequencies. The harmonic frequencies can be determined, for example, from a Fourier analysis of the response signal.

To obtain additional parameters, the response signal can be low pass filtered and various characteristics of the filtered signal can be measured. For example, these characteristics can include a burst depth 54 that represents the average modulation depth of the signal at the illustrated frequency and a burst length that 56 represents the duration of an average signal "burst" within the response signal. Other signal length parameters that can be utilized as well including a modulation length 58 that represents the average duration of modulation within each burst and a modulation start length 60 that measures the average duration of a burst after the start of modulation. It will be appreciated that these values can be determined for each modulation frequency in the signal.

Similarly, the number of cycles at each frequency can be utilized as parameters, with the number of cycles calculated for a maximum modulation length and a minimum modulation length. The zero crossings for the signal at each frequency can also be utilized as parameters, with the zero crossings calculated for a maximum modulation length and a minimum modulation length. A second illustrated signal 64 represents the filtered signal 52 after a frequency shift equal to the negative of the modulation frequency, filtering, and AM demodulation. From the second illustrated signal 64, an alternate modulation length 66 can be calculated for each modulation frequency. In an exemplary implementation, thirty parameters derived from the above measurements were evaluated for use in the verification process.

In an exemplary embodiment, along with the parameters described above, an additional group of thirty parameters was generated according to a principle component analysis. A set of Eigenvectors were generated via the principle components analysis, and data associated with the existing features were translated into the coordinate system defined by the eigenvectors to produce a set of thirty uncorrelated features. It will be appreciated that different classes of RFID tags will respond differently to different combinations of these sixty features. For a given class of RFID tags, response signals associated with a statistically significant set of RFID tags are measured, and the various available features are evaluated based on their ability to help differentiate between different members of the class of the RFID. For any given standard of RFID, the most effective measurements, those most affected by the technically uncontrollable features associated with the manufacturing process, will be evaluated and selected to form a RFID fingerprint or signature of the devices from this class of RFID.

Figure 3:
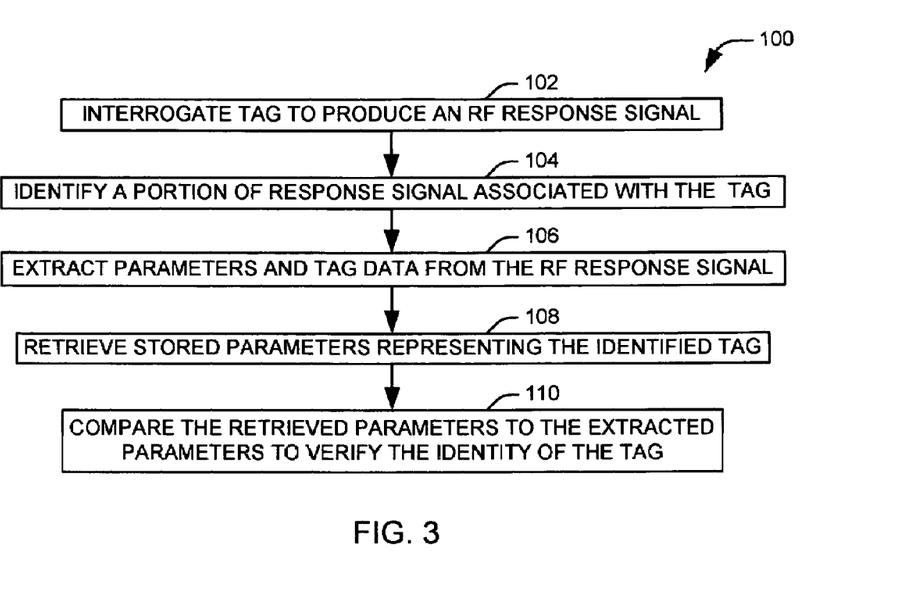
FIG. 3 illustrates a methodology for verifying the identity of an RFID tag in accordance with an aspect of the present invention.
Figure 4:
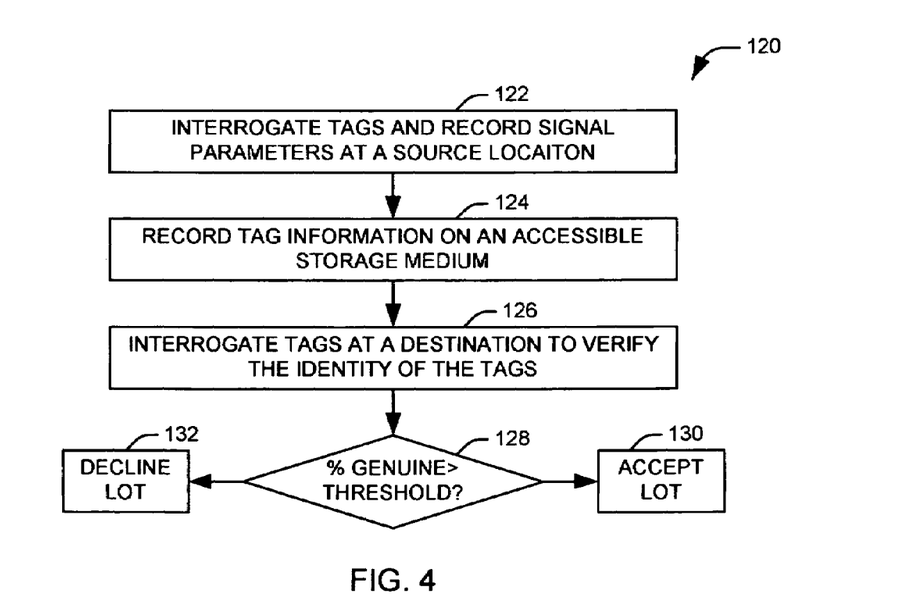
FIG. 4 illustrates a methodology for verifying the legitimacy of a lot of products in accordance with an aspect of the present invention.

In view of the foregoing structural and functional features described above, methodology in accordance with various aspects of the present invention will be better appreciated with reference to FIGS. 3 and 4. While, for purposes of simplicity of explanation, the methodology of FIGS. 3 and 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 3 illustrates a methodology 100 for verifying the identity of an RFID tag in accordance with an aspect of the present invention. At 102, the RFID tag is interrogated to produce a response signal. For example, the RFID tag can be interrogated via a traditional RFID tag reader to produce a radio frequency (RF) response signal. At 104, the RFID tag can be paired with an associated portion of the RF signal via a synchronization protocol associated with the reader. At 106, signal parameters, representing technically uncontrollable features of the RFID tag resulting from the manufacturing process, are extracted from the portion of response signal associated with the RFID tag. RFID tag information, providing a purported identity of the RFID tag, can also be extracted from the signal.

At 108, a set of parameters is retrieved from an appropriate storage medium according to the RFID tag information. The appropriate storage medium can include, for example, a local memory associated with the RFID tag reader, a remote database containing RFID data from the manufacturer, and even the RFID tag itself. In the latter case, the RFID tag contains an encoded copy of the set of parameters. Generally, the parameter set is measured and signed by the original product manufacturer. Tags of the "write once, read many" variety are most likely to be used in this manner. In this implementation, the stored parameter set is provided to the reader in the standard RFID response.

At 110, the extracted signal parameters are compared to the stored signal parameters to verify the identity of RFID tag. In an exemplary implementation, a distance value (e.g., Euclidian, Manhattan, etc.) is calculated and compared to a threshold value. If the distance value falls below the threshold, the RFID tag is verified as genuine. Otherwise, the differences between the extracted parameters and the stored parameters are sufficient to indicate that the RFID tag is not the original tag, and a user is notified that the identity of the tag is suspect.

For example, in one implementation, the manufacturer of a product would attach a commercial RFID tag, likely a tag of the "write once, read many" variety, to each product during the manufacturing process. The RFID tag would be interrogated, and an RFID verification system in accordance with an aspect of the present invention would measure appropriate parameters of the RFID response signal. Data bits representing these parameters are added to the usual data for an RFID tag, such as product type, batch, and date of manufacture. Optionally, the data can be encrypted. Any recipient of the product could use an RFID reader equipped with a verification system in accordance with the present invention to read the product type, batch number, date of manufacturer or other data as encoded by the manufacturer. If encryption were used, the reader would have access to the manufacture's encryption keys in order to decrypt the data. The verification component would extract a plurality of parameters from the response signal. If the extracted parameters match those measured during the production cycle, the recipient would be assured that the RFID was the same one that left the factory.

In another implementation, an RFID product code number can be used to index a product description and price. These values are summarized into a receipt for the customer, describing each item and its price. These receipts are typically dated, and serialized. An RFID reader equipped with a verification module in accordance with an aspect of the present invention can be utilized to determine verification parameters for each product, which can be stored in a store database. Each set of parameters can be associated in memory with a specific product on the receipt. In one well known fraud, the instigator purchases a product, makes a copy of the receipt, and returns with the receipt to the store to get a refund for the product. Several days later, the instigator returns with the copied receipt, picks up another of the product from the store inventory, and attempts to return that product for a second refund. By using an RFID reader having a verification module in accordance with aspect of the present invention, the fraud can be discovered when the verification parameters associated with the second copy of the product does not match the stored set of verification parameters associated with the receipt.

FIG. 4 illustrates a methodology 120 for verifying the legitimacy of a lot of products in accordance with an aspect of the present invention. At 122, verification parameters are determined for each product within the lot at a product source, such as a factory or warehouse. For example, the manufacture can use an RFID reader equipped with a verification module in accordance with an aspect of the present invention to interrogate the RFID tags associated with the lot and measure verification parameters for each product. At 124, the verification parameters associated with each product and its associated RFID tag are recorded on an appropriate storage medium. For example, the verification parameters can be stored in a database maintained by the manufacturer or encoded on the individual RFID tags.

At 126, the plurality of RFID tags associated with the lot are interrogated at a destination for the product, and a set of verification parameters are extracted for each of the plurality of products in the lot. The extracted sets of verification parameters are compared to the stored parameter sets to verify the identity of the products within the lot. The number of matches found can be recorded as well as the total number of products, such that a percentage of genuine products can be determined. At 128, the ratio of genuine products can be compared to a threshold value. If the percentage exceeds the threshold (Y), the unmatched products can be assumed to be a product of measurement error. Accordingly, the methodology advances to 130, where the product lot is accepted. If the percentage of genuine products is less than the threshold value, the product lot is presumed to have been tampered with. In this case, the methodology advances to 132, where the product lot is rejected.

For example, in one class of RFID, all RFID tags associated with a given product line contain the same identical numeric value, such that each item will "ring up" with the same code. In this case, the manufacturer would collect verification parameters for each item in a database and distribute this database to those with verification enabled RFID readers that are to be used for the acceptance of the product. The database would indicate that a particular group of sets of verification parameters are expected to be found on the shipping pallet. If measurements corresponding to all or most of the verification sets are found on the pallet, the recipient knows that the pallet has not been tampered with, and there has not been product substitution. Of course, the database would either be distributed through trusted channels, or digitally signed, or protected by some other standard method for the protection of integrity.

Similarly, a fraud prevention agent could verify a lot of software packages within an electronics store. Walking down the software isle with verification enabled RFID reader; he detects no valid responses from a given manufacturer, while looking at a whole isle of product CDs labeled as the manufacturers products. Accordingly, the counterfeit software and its cloned RFID tags can be efficiently detected and removed from circulation.

Figure 5:
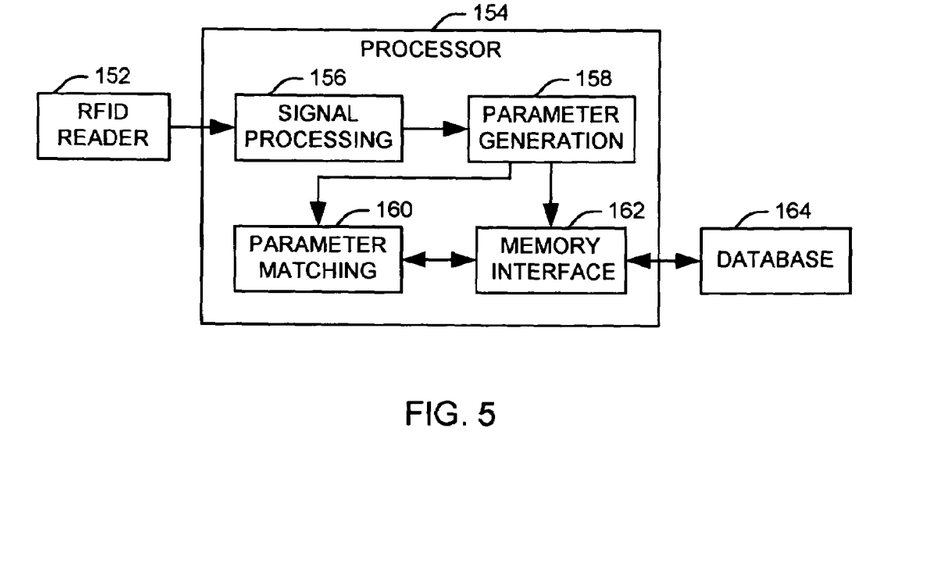
FIG. 5 illustrates a functional block diagram of an exemplary implementation of an RFID reader system in accordance with an aspect of the present invention.

FIG. 5 illustrates a functional block diagram 150 of an exemplary implementation of an RFID reader system in accordance with an aspect of the present invention. The RFID reader system 150 is configured to interrogate an RFID tag to obtain a response signal and extract a plurality of features from the response signal. An RFID reader 152 is configured to interrogate an RFID tag and receive a response signal from the tag. The response signal contains a purported identity for the RFID tag, represented as digital information modulated into the response signal via an appropriate modulation scheme.

A processor 154 is configured to demodulate and interpret the digital information and extract a plurality of parameters from the response signal that represent technically uncontrollable features of the RFID tag. These features can be used in verifying the purported identity of the RFID tag. A number of elements 156, 158, 160, and 162 can be implemented as software or firmware within the processor 154 to analyze the response signal. A signal processing element 156 is configured to digitize, downconvert, and demodulate the response signal. Accordingly, a demodulated response signal can be extracted and provided to a parameter generation element 158. The parameter generation element 158 extracts a plurality of parameters from the demodulated signal for use in verifying the identity of the RFID tag. It will be appreciated that these parameters (e.g., modulations frequencies, etc.) are evaluated to a precision that cannot be duplicated during the manufacturing process, such that the parameters represent technically uncontrollable features of the response signal. Table 1 illustrates a number of possible parameters that can be used in an exemplary implementation of the RFID reader system.

TABLE 1

| Parameter | Description |
|---|---|
| 1ModDepth | Modulation Depth/Burst Level |
| 2ComFreq | (Mod Low Freq * 3 + Mod High Freq * 2)/2 |
| 3ComLen | (Mod Length Low * 3 + Mod Length High * 2)/2 |
| 4BurstLnL | Burst Length Low |
| 5BurstLnH | Burst Length High |
| 6ModLenL | Modulation Length Low |
| 7ModLenH | Modulation Length High |
| 8ModFreqL | Modulation Frequency Low |
| 9ModFreqH | Modulation Frequency High |
| 10ModSrtL | Modulation Start Length Low |
| 11ModSrtH | Modulation Start Length High |
| 12Har2L | 2nd Harmonic Level for Low Modulation Frequency |
| 13Har3L | 3rd Harmonic Level for Low Modulation Frequency |
| 14Har4L | 4th Harmonic Level for Low Modulation Frequency |
| 15Har5L | 5th Harmonic Level for Low Modulation Frequency |
| 16Har2H | 2nd Harmonic Level for High Modulation Frequency |
| 17Har3H | 3rd Harmonic Level for High Modulation Frequency |
| 18Har4H | 4th Harmonic Level for High Modulation Frequency |
| 19Har5H | 5th Harmonic Level for High Modulation Frequency |
| 20MCnt1 | Number Cycles Based on Mod Freq Low, Mod Length Low |
| 21MCnt2 | Number Cycles Based on Mod Freq High, Mod Length Low |
| 22MCnt3 | Number Cycles Based on Mod Freq Low, Mod Length High |
| 23MCnt4 | Number Cycles Based on Mod Freq High, Mod Length High |
| 24MZn1 | Number Zero Crossings for Mod Freq Low, Mod Length Low |
| 25MZn2 | Number Zero Crossings for Mod Freq Low, Mod Length High |
| 26MZn3 | Number Zero Crossings for Mod Freq High, Mod Length Low |
| 27MZn4 | Number Zero Crossings for Mod Freq High, Mod Length High |
| 28ModLenAL | Alternate Modulation Length Low |
| 29ModLenAH | Alternate Modulation Length High |
| 30DCorlFLH | De-correlated parameters 8ModFreqL and 9ModFreqH |

The extracted parameters can be provided as a first input to a parameter matching element 160. The purported identity of the tag can be provided to a memory interface 162. The memory interface 162 queries a database 164 to retrieve at least one set of stored parameters corresponding to a purported identity of the RFID tag. For example, the database 164 can be located on a remote computer and the memory interface 162 can comprise a network interface that queries the remote database via an internet connection. Once the stored parameters are retrieved, they are provided as a second input to the parameter matching element 160. The parameter matching component 160 then determines if the RFID tag has technically uncontrollable features similar to those associated with the purported identity of the tag, such that the identity of the tag can be confirmed. In one implementation, a distance value is computed between the extracted parameters and the stored parameter set. For example, a Euclidean distance can be calculated as the squared sum of the differences between each extracted parameter and its associated stored parameter. The distance value is compared to a threshold value, and the identity of the RFID tag is verified only if the distance value falls below the threshold value.

Figure 6:
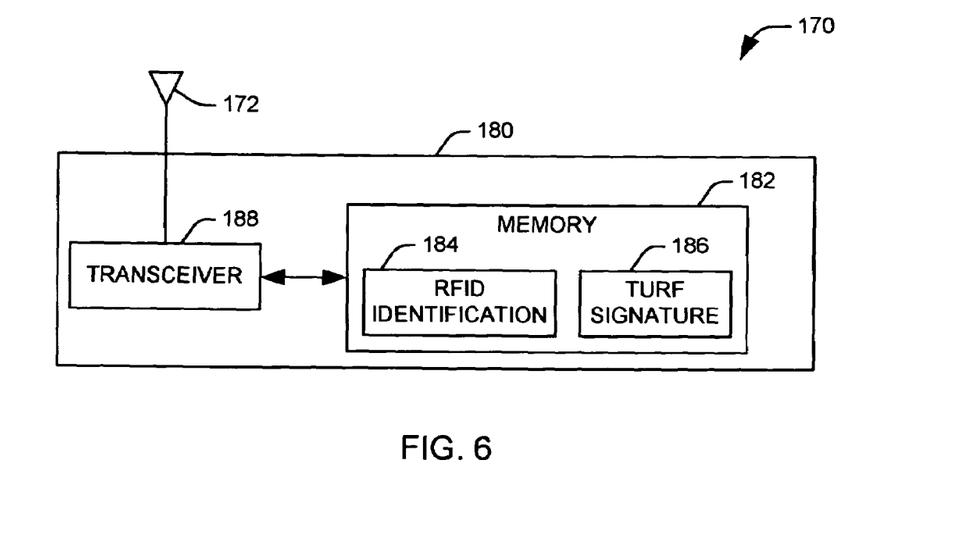
FIG. 6 illustrates a functional block diagram of an exemplary RFID tag in accordance with an aspect of the present invention.

FIG. 6 illustrates a functional block diagram of an exemplary RFID tag 170 in accordance with an aspect of the present invention. The tag 170 includes an antenna 172 that can be used for receiving an interrogation sequence from an RFID reader. For example, the antenna 172 can comprise a metal coil traced on the surface of the tag 170. It will be appreciated that the interrogation sequence can generate operating power, in whole or in part, for a chip 180 containing circuitry associated with the tag (e.g., a passive tag. Alternatively, the chip 180 can comprise a separate power source (e.g., an active tag).

The chip 180 comprises a memory 182 that includes RFID identification 184 for the tag 170. The RFID identification 184 includes a unique identification number for a tag or a series of tags that can be referenced (e.g., in an associated database) to determine one or more properties of a product associated with the tag 170. In accordance with an aspect of the present invention, the memory 182 can also comprise a signature 186 for the chip, representing a set of technically uncontrollable RFID features (TURF), for the tag 170. The TURF signature 186 can comprise a set of parameters corresponding to a plurality of features that can be extracted from a response signal from the chip. The TURF signature 186 can be measured by an RFID reader when the chip is manufactured, and written to the chip as part of a "Write once, read many" process. In response to an interrogation sequence, the contents of the memory 182 can be provided to a transceiver 188. The transceiver 188 generates an appropriate modulated signal for conveying the contents of the memory 182 to the interrogating RFID reader. The modulated signal can then be broadcast through the antenna 172.

Figure 7:
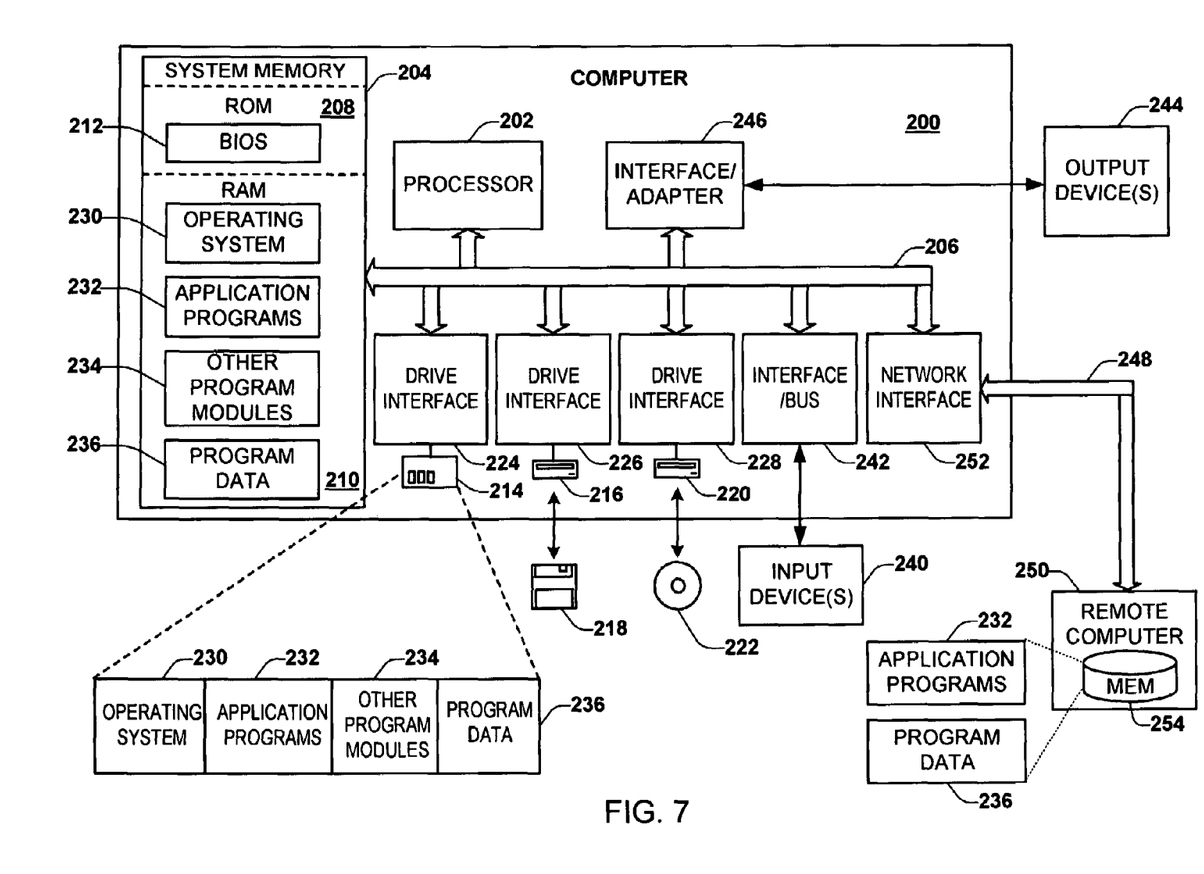
FIG. 7 illustrates a computer system that can be employed to implement systems and methods described herein, such as based on computer executable instructions running on the computer system.

FIG. 7 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 306 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 248 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A radio frequency identification (RFID) reader system, comprising:
   an RFID reader that queries an RFID tag, receives a response from the tag in the form of an RFID response signal, and recovers digital information encoded on the tag from the RFID response signal; and
   a verification module that extracts a plurality of characteristics of the RFID response signal associated with technically uncontrollable features of the RFID tag and verifies the identity of the RFID tag according to these characteristics.

2. The system of claim 1, the verification module comprising an RFID signature memory that contains at least one set of parameters corresponding to the extracted plurality of characteristics, such that the identify of the RFID tag is verified by comparing the extracted plurality of characteristics to the at least one set of parameters.

3. The system of claim 1, the recovered digital information comprising at least one set of parameters corresponding to the extracted plurality of characteristics, such that the identify of the RFID tag is verified by comparing the extracted plurality of characteristics to the at least one set of parameters.

4. The system of claim 1, the verification module comprising a network interface that is configured to retrieve at least one set of parameters, corresponding to the extracted plurality of characteristics, from a remote database, such that the identify of the RFID tag is verified by comparing the extracted plurality of characteristics to the at least one set of parameters.

5. The system of claim 1, the verification module comprising an RFID identifier that compares the extracted plurality of characteristics to a set of parameters associated with the plurality of characteristics, the RFID identifier being configured to calculate a distance value between the extracted plurality of characteristics and the set of parameters and compare the calculated distance value to a threshold value.

6. The system of claim 1, the technically uncontrollable features comprising a burst depth and a burst length for each of a plurality of modulation frequencies associated with the RFID response signal.

7. The system of claim 1, the technically uncontrollable features comprising the location of zero crossings within the RFID response signal.

8. The system of claim 1, the technically uncontrollable features comprising a modulation length that represents the average length of modulation in each of a plurality of bursts comprising the response signal.

9. The system of claim 1, the verification module being configured to receive synchronization data from the RFID reader that identifies a portion of the RFID response signal associated with the RFID tag and extracts the plurality of characteristics from the identified portion of the RFID response signal.

10. A method for verifying the identity of a radio frequency identification (RFID) tag, comprising:
    interrogating an RFID tag to generate an RFID response signal;
    extracting a plurality of parameters from the RFID response signal, having variances associated with technically uncontrollable features of the RFID tag; and
    comparing the extracted plurality of parameters with at least one stored set of parameters in an associated memory to verify the identity of the RFID tag.

11. The method of claim 10, wherein comparing the extracted plurality of parameters comprises reading an encrypted set of parameters from the RFID tag, such that the RFID tag comprises the associated memory.

12. The method of claim 10, wherein comparing the extracted plurality of parameters comprises:
    determining a difference between each of the extracted plurality of parameters and a corresponding one of a set of parameters from the at least one stored set of parameters;
    determining a distance value from the determined differences; and
    comparing the distance value to a threshold value.

13. The method of claim 10, wherein interrogating an RFID tag to generate a radio frequency (RF) response signal comprises interrogating a plurality of RFID tags associated with a lot of tagged products, identifying a portion of the RF response signal associated with each of the RFID tags, extracting a plurality of parameters from the RF response signal comprises extracting a set of parameters from respective portions of the RF response signal associated with the plurality of RFID tags, and comparing the extracted plurality of parameters with at least one stored set of parameters comprises comparing each of the extracted sets of parameters with one of a plurality of stored sets of parameters and accepting the lot of tagged products if a threshold percentage of products are verified.

14. The method of claim 10, wherein comparing the extracted plurality of parameters with at least one stored set of parameters comprises:
    determining a purported identity for an RFID tag associated with a retail product that is returned to a retail location after an initial purchase;
    referencing a database of RFID tags that contains for each of a plurality of RFID tags, a set of parameters, representing technically uncontrollable features of the RFID tag, that were recorded at the time of the initial purchase; and
    comparing the set of parameters corresponding to the purported identity of the RFID tag to the extracted plurality of parameters from the response signal to verify the purported identity of the RFID tag.

15. The method of claim 10, wherein comparing the extracted plurality of parameters with at least one stored set of parameters in an associated memory comprises retrieving the at least one stored set of parameters from a remote memory via a network connection.

16. The method of claim 10, wherein extracting a plurality of parameters from the response signal comprises:
    applying a frequency shift to the response signal that is equal to the negative of a first modulation frequency;
    filtering the frequency shifted response signal;
    demodulating the filtered response signal; and
    determining a modulation length for the first modulation frequency from the demodulated response signal.

17. The method of claim 10, wherein extracting a plurality of parameters from the response signal comprises determining a plurality of harmonic frequencies associated with each of a plurality of modulation frequencies associated with the response signal.

18. The method of claim 10 further comprising identifying a portion of the RFID response signal associated with the RFID tag, wherein extracting a plurality of parameters from the RFID response signal comprises extracting a plurality of parameters from the identified portion of the RFID response signal.

19. A radio frequency identification (RFID) reader system configured to verify the identity of an interrogated tag, comprising:
    means for interrogating an RFID tag to produce an RFID response signal;
    means for analyzing the RFID response signal to generate a plurality of verification parameters, the plurality of verification parameters having variances associated with technically uncontrollable features of the RFID tag; and
    means for comparing the plurality of verification parameters to a set of stored parameters associated with the RFID tag to verify the identity of the RFID tag.

20. The RFID reader system of claim 19, the means for comparing comprising means for retrieving the set of stored parameters from a remote computer memory.

21. The RFID reader system of claim 19, the means for analyzing the response signal comprising means for digitizing the response signal and means for downconverting the response signal.

22. The RFID reader system of claim 19, the means for analyzing the response signal comprising means for precisely determining at least one modulation frequency associated with the response signal.

23. The RFID reader system of claim 19, the means for interrogating comprising means for identifying a portion of the RFID response signal associated with the RFID tag, and the means for analyzing the RFID response signal comprising means for analyzing the identified portion of the RFID response signal.

* * * * *